United States Patent
Goto et al.

(10) Patent No.: US 7,281,789 B2
(45) Date of Patent: *Oct. 16, 2007

(54) WATER BASE INK SET FOR INK-JET RECORDING

(75) Inventors: Kazuma Goto, Nagoya (JP); Hideo Ohira, Tajimi (JP); Masahito Kato, Nagoya (JP); Masaya Fujioka, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 196 days.

This patent is subject to a terminal disclaimer.

(21) Appl. No.: 10/850,412

(22) Filed: May 19, 2004

(65) Prior Publication Data

US 2004/0233263 A1   Nov. 25, 2004

(30) Foreign Application Priority Data

May 21, 2003   (JP)   ............................ 2003-143823

(51) Int. Cl.
   *G01D 11/00*   (2006.01)
(52) U.S. Cl. ..................................... 347/100
(58) Field of Classification Search ................. 347/100
   See application file for complete search history.

(56) References Cited

U.S. PATENT DOCUMENTS 5,745,140 A    4/1998  Stoffel et al.
6,386,695 B1   5/2002  Kowalski
6,631,974 B2   10/2003 Shindo
6,709,095 B2   3/2004  Sago et al.
2002/0109744 A1  8/2002  Shindo
2002/0135650 A1* 9/2002  Nagai et al. ................. 347/100
2003/0058318 A1* 3/2003  Sago et al. .................. 347/100
2003/0076393 A1* 4/2003  Lee et al. .................... 347/100

FOREIGN PATENT DOCUMENTS

EP   1186 639 A1    3/2002
JP   2002173623     6/2002
JP   2002234151     8/2002

* cited by examiner

Primary Examiner—Manish S. Shah
Assistant Examiner—Laura E. Martin
(74) Attorney, Agent, or Firm—Reed Smith LLP

(57) ABSTRACT

In a water base ink set for ink-jet recording, a pigment ink has a total ion concentration of lithium ion, potassium ion, and sodium ion of not less than 60 ppm and a total ion concentration of divalent or multivalent metal ion or ions of not more than 10 ppm, and a dye ink has a total ion concentration of lithium ion, potassium ion, and sodium ion of not more than 1,800 ppm and a total ion concentration of divalent or multivalent metal ion or ions of not more than 10 ppm, wherein the total ion concentration of lithium ion, potassium ion, and sodium ion of the dye ink is 3 to 25 times that of the pigment ink. Accordingly, the water base ink set in which the pigment ink and the dye ink can be reliably used in combination without complicating a maintenance system is provided.

38 Claims, 2 Drawing Sheets

WATER BASE INK SET FOR INK-JET RECORDING

BACKGROUND OF THE INVENTION

1. Field of the Invention

The present invention relates to a water base ink set for ink-jet recording and an ink-jet recording apparatus based on the use of the same.

2. Description of the Related Art

In the ink-jet recording system, ink droplets are formed by using the ink discharge method including, for example, the electrostatic attraction method, the method in which mechanical vibration or displacement is applied to the ink by using a piezoelectric element or the like, and the method in which bubbles are generated by heating the ink to utilize the pressure generated thereby. All or a part of the ink droplets are adhered to a recording objective material such as paper to perform the recording.

Those hitherto employed in many cases as the ink to be used when the recording is performed by using the ink-jet system include dye inks in which dyes such as direct dyes and acid dyes are used as coloring agents, for the following reason. That is, in the case of the dye ink, any inconvenience such as precipitation is hardly caused, and the handling of the ink is relatively easy, because the dye is dissolved in the ink. Further, in the case of the dye ink, the dye molecules absorb the light at a wavelength inherent in the dye molecules without allowing the dye molecules to cause any irregular reflection of the light on the surface and at the inside of the paper. Therefore, the dye ink is advantageous in that the printing can be performed with vivid coloration.

However, in the case of the dye ink, the dye is dissolved in the ink at the molecular level. Therefore, the dye behaves in the same manner as the solvent medium used for the ink after the printing. Therefore, the dye ink is disadvantageous in that the dye permeates into the paper and the concentration is lowered in the image area. Therefore, the pigment ink, which is based on the use of the pigment as the coloring agent, is presently used in many cases. In the case of the pigment ink, the pigment contained in the ink does not behave in the same manner as the ink solvent. The pigment particles are prohibited from movement, for example, by the additive and the fiber contained in the paper, and they do not permeate into the paper. Therefore, the amount of the pigment remaining on the paper surface is increased. As a result, it is possible to increase the concentration in the image area, and it is possible to enhance the contrast as well. The printer based on the ink-jet system involves a common problem, i.e., a problem of blurring in which the edge of the image area is notched due to the nonuniform spread of the ink. However, the pigment, which is dispersed as the solid content in the pigment ink, is prohibited from movement, for example, by the additive and the fiber contained in the paper, on the surface of the paper and/or at the inside of the paper. Therefore, the ink is scarcely blurred, and it is possible to obtain the sharp edge of the image area.

On the other hand, the pigment, which is dispersed in the pigment ink, has been disadvantageous in that the vividness of the printing is lowered, because the pigment particles irregularly reflect the light on the surface of the paper and/or at the inside of the paper. In view of the above, U.S. Pat. No. 5,745,140 discloses an ink set composed of a combination of a black ink based on the use of a black pigment such as carbon black as a coloring agent and a color ink based on the use of a dye as a coloring agent. When the printing is performed by using such an ink set, the following feature is obtained. That is, the letter edges are sharp, the contrast is high, and the visual recognition performance of the letters is excellent when letter data principally based on the use of the black color is subjected to the printing. When graphic data is subjected to the printing, color portions provide vivid coloration. Therefore, it is possible to satisfy both of the visual recognition performance of the letters and the vividness of the color portions.

However, as for the ink set composed of the pigment ink based on the use of the pigment as the coloring agent and the dye ink based on the use of the dye as the coloring agent, when the pigment ink and the dye ink make contact with each other and they are mixed with each other, then the pigment in the pigment ink, which is charged to have the negative electric charge, is bound to sodium ion as counter ion of the dye contained in the dye ink, and the electric charge of the negatively charged pigment becomes zero. Therefore, the electric repulsive force of the pigment is lost, the dispersion becomes unstable, and any coagulation occurs.

Japanese Patent Application Laid-open No. 2002-173623 discloses an ink set which is characterized in that a first electric charge (anionic property or cationic property) is given to a black ink, and a second electric charge (cationic property of anionic property), which is opposite to the first electric charge, is given to a color ink. In this known method, the property, which is opposite to the property possessed by the black ink, is given to the color ink as described above, and thus the qualities including, for example, the satisfactory bleeding quality, the quick drying performance, and the high optical density, are enhanced by coagulating the black pigment contained in the black ink when the black ink and the color ink make contact with each other on the paper surface. However, even in the case of the ink set based on the combination as described above, the clog-up occurs at the head nozzle of the printer due to the appearance of the pigment coagulate, and/or the pigment coagulate is adhered and secured to the surroundings of the head nozzle to damage the repelling ink coat surface. As a result, the discharge failure is caused, and printing quality is deteriorated. As described above, various inconveniences have hitherto occur due to the pigment coagulation.

A conventional ink-jet recording apparatus is disclosed in Japanese Laid-Open Patent Publication No. 2002-234151 corresponding to U.S. Pat. No. 6,631,974. The ink-jet recording apparatus comprises a printing head and a mechanism for collectively wiping nozzles for respective colors included in the printing head. In the case of the ink-jet recording apparatus as described above, the nozzle arrays for the respective colors, which are arranged in the printing head, are disposed extremely approximately to one another. For this reason, the following structure is provided. That is, a suction cap, which is equipped to suck and purge the ink contained in the printing head, collectively covers the nozzle arrays for two colors. In this structure, for example, the nozzles arrays for the black ink and the cyan ink are collectively covered with the suction cap. Therefore, when the suction purge is performed, for example, upon the initial introduction of the inks, then the inks of two colors, which are simultaneously sucked by the aid of the suction cap as described above, are mixed with each other in the suction cap, they thereafter arrive at a suction pump via a tube, and they are discharged to a drain tank.

In the case of the ink-jet recording apparatus as described above, the maintenance system is simplified, and it is possible to suppress the production cost to be cheap. However, for example, when the inks are initially introduced, then the pigment ink and the dye ink are mixed with each other, for example, at the printing head nozzle surface, the wiper, the suction cap, the suction pump, and the drain tank, and the pigment particles are coagulated. As a result, the printing head nozzle is clogged by the pigment coagulate, and/or the pigment coagulate is adhered and secured to the neighborhoods of the printing head nozzle to damage the repelling ink coat surface. Consequently, the discharge failure is caused, and the printing quality is deteriorated in some cases. Further, when the pigment coagulate is adhered and secured to the wiper and the suction cap, then the wiping operation is nonuniformly performed, and the air-tightness of the suction cap is deteriorated. Furthermore, another inconvenience also arises, for example, such that the pigment coagulate is secured to the interior of the suction pump to cause any malfunction. When the pigment particles are coagulated, the reliability of the ink-jet recording apparatus is extremely deteriorated.

In order to respond to the inconveniences as described above, for example, the following countermeasures are applied. That is, a plurality of wipers are arranged so that the pigment ink and the dye ink are not mixed with each other in the vicinity of the nozzles. The heads are provided in a divided manner for the pigment ink and the dye ink respectively. The maintenance system is divided into those to be used for the pigment ink and the dye ink. However, even when the countermeasures as described above are applied, a problem arises such that the production cost of the printer becomes expensive. Therefore, an ink set has been required, in which the pigment ink and the dye ink can be used in combination, the pigment is not coagulated, and it is possible to obtain a high printing quality even when the ink set is carried on a conventional low cost ink-jet recording apparatus.

SUMMARY OF THE INVENTION

The present invention has been made in order to solve the problems as described above, an object of which is to provide a water base ink set for ink-jet recording and an ink-jet recording apparatus provided with the same in which a pigment ink and a dye ink can be used in combination without complicating the arrangement of a maintenance system, and a stable printing quality is obtained with high reliability.

According to a first aspect of the present invention, there is provided a water base ink set for ink-jet recording comprising:

a pigment ink which contains water, a water-soluble organic solvent, and a pigment and which includes at least one of lithium ion, potassium ion, and sodium ion, wherein a total ion concentration $Cp1$ of the ions satisfies 60 ppm$\leq Cp1$, and a total ion concentration $Cp2$ of divalent or multivalent metal ion or ions satisfies $Cp2 \leq 10$ ppm; and a dye ink which contains water, a water-soluble organic solvent, and a dye and which includes at least one of lithium ion, potassium ion, and sodium ion, wherein a total ion concentration $Cd1$ of the ions included in the dye ink satisfies $Cd1 \leq 1,800$ ppm, and a total ion concentration $Cd2$ of divalent or multivalent metal ion or ions included in the dye ink satisfies $Cd2 \leq 10$ ppm, wherein:

$Cd1 \leq 25\, Cp1$ is satisfied.

The ink set of the present invention may be in a form of ink cartridge. The ink cartridge may have, for example, compartments in which the pigment ink and the dye ink are accommodated respectively. The ink cartridge may be carried on an ink-jet head. Alternatively, the ink cartridge may be attached to the interior of a main body case of an ink-jet recording apparatus. In the case of the latter, the ink is supplied from the ink cartridge to the ink-jet head, for example, via a flexible tube.

According to a second aspect of the present invention, there is provided an ink-jet recording apparatus comprising:

an ink-jet head which is formed with nozzles for jetting an ink of a first color and nozzles for jetting an ink of a second color different from the first color; and a maintenance unit which includes a wiper for wiping the nozzles for the first and second colors, a suction cap for capping the nozzles, a suction pump for sucking the ink through the suction cap, and a drain tank for storing a drain discharged from the suction pump, wherein:

the ink of the first color is a pigment ink which contains water, a water-soluble organic solvent, and a pigment and which includes at least one of lithium ion, potassium ion, and sodium ion, wherein a total ion concentration $Cp1$ of the ions satisfies 60 ppm$\leq Cp1$, and a total ion concentration $Cp2$ of divalent or multivalent metal ion or ions satisfies $Cp2 \leq 10$ ppm; and the ink of the second color is a dye ink which contains water, a water-soluble organic solvent, and a dye and which includes at least one of lithium ion, potassium ion, and sodium ion, wherein a total ion concentration $Cd1$ of the ions included in the dye ink satisfies $Cd1 \leq 1,800$ ppm, and a total ion concentration $Cd2$ of divalent or multivalent metal ion or ions included in the dye ink satisfies $Cd2 \leq 10$ ppm, and wherein $Cd1 \leq 25\, Cp1$ is satisfied.

In the present invention, the pigment ink may further contain polyvinylpyrrolidone having a weight average molecular weight of 10,000 to 40,000 by 0.5 to 2% by weight. The pigment ink may be a black ink and the dye ink may be a color ink. In the pigment ink, 70 ppm$\leq Cp1$ may be satisfied. In the dye ink, $Cd1 \leq 1,700$ may be satisfied. In the pigment ink, $Cp2 \leq 2$ ppm may be satisfied. In the dye ink, $Cd2 \leq 2$ ppm may be satisfied. The pigment ink may include three of the lithium ion, the potassium ion, and the sodium ion. The dye ink may include three of the lithium ion, the potassium ion, and the sodium ion. The water-soluble organic solvent may be triethylene glycol n-butyl ether.

DESCRIPTION OF THE PREFERRED EMBODIMENTS

Figure 1:
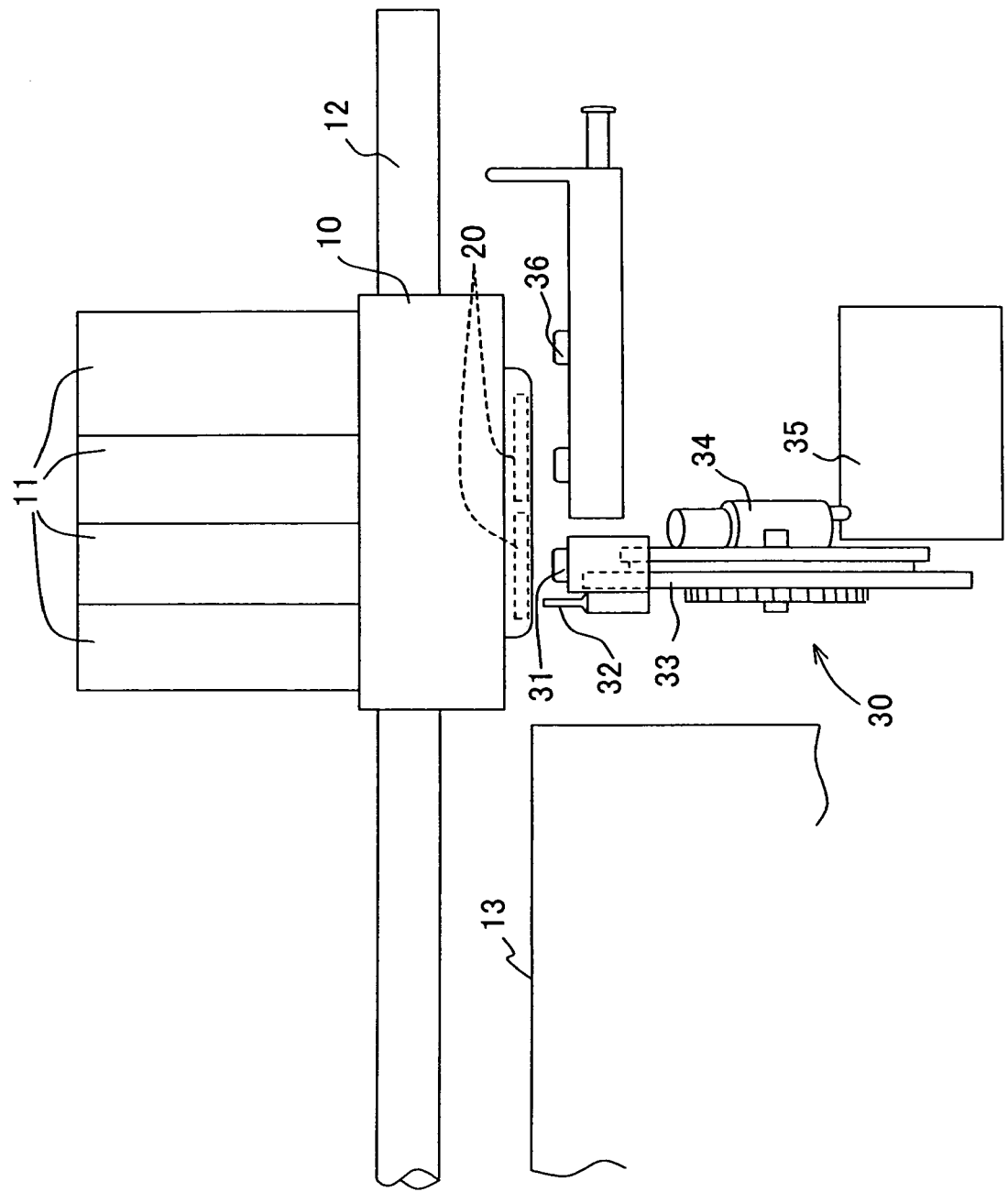
FIG. 1 shows a front view illustrating an internal structure of an ink-jet recording apparatus.

As a result of diligent investigations, the inventors have found out the fact that the property of coagulation, which is brought about when the pigment ink and the dye ink are allowed to make contact with each other, is affected by the ratio of the concentration of the metal ions contained in the pigment ink and the dye ink, especially the total ion concentrations of the lithium ion, the potassium ion, and the sodium ion of the both inks. Thus, the present invention has been completed.

The water base ink set for ink-jet recording of the present invention comprises the pigment ink which contains the pigment as the coloring agent and the dye ink which contains the dye as the coloring agent.

The pigment ink contains the pigment as the coloring agent. The pigment may include, for example, carbon black as well as organic pigments represented, for example by azo pigments such as azo lake, insoluble azo pigment, condensed azo pigment, and chelate azo pigment; polycyclic pigments such as phthalocyanine pigment, perylene pigment, perynone pigment, anthraquinone pigment, quinacridone pigment, dioxazine pigment, thioindigo pigment, isoindolinone pigment, and quinophthalone pigment; dye lakes such as acidic dye type lake; nitro pigments; nitroso pigments; and aniline black daylight fluorescent pigments. Other pigments are also usable provided that they are dispersible in the aqueous phase.

The self-dispersing type pigment may include, for example, CAB-O-JET 300, CAB-O-JET 200, CAB-O-JET 250, CAB-O-JET 260 and CAB-O-JET 700 (produced by Cabot).

Among the pigments as described above, carbon black may be exemplified as the most general black pigment. The carbon black may include, for example, furnace black, lamp black, acetylene black, and channel black. Specifically, for example, there may be exemplified No. 25, No. 33, No. 40, No. 47, No. 52, No. 900, No. 2300, MCF-88, MA 600, MA 7, MA 8, and MA 100 (produced by Mitsubishi Chemical Corporation); Color Black FW1, Color Black FW2, Color Black FW2V, Color Black FW18, Color Black FW200, Color Black S150, Color Black S160, Color Black S170, Printex 35, Printex 150T, Printex U, Printex V, Printex 140U, Printex 140V, Special Black 6, Special Black 5, Special Black 4A, and Special Black 4 (produced by Degussa); Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (produced by Columbia); and Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan (produced by Cabot). When the pigment as described above is used as the coloring agent for the pigment ink, the pigment can be dispersed in accordance with any conventionally known method by using, for example, a dispersing agent or another additive. It is not necessarily indispensable to perform any dispersing treatment for the self-dispersing type dispersing agent as described above.

The content of the pigment is preferably 0.1 to 20% by weight as the solid amount. The content is more preferably 0.5 to 12% by weight and much more preferably 2 to 8% by weight.

The pigment ink contains at least one ion of the lithium ion, the potassium ion, and the sodium ion, and the total ion concentration thereof is not less than 60 ppm and preferably not less than 70 ppm. If the total ion concentration is less than 60 ppm, the coagulation occurs when the pigment ink and the dye ink are allowed to make contact with each other, for the following reason. That is, it is considered that if the total ion concentration of the lithium ion, the sodium ion, and the potassium ion in the pigment ink is smaller than the total ion concentration of the lithium ion, the sodium ion, and the potassium ion in the dye ink on the basis of the absolute amount, then the balance of the electric repulsive force of the pigment is collapsed, the dispersion becomes unstable, and the coagulation is caused due to the sudden increase in concentrations of the lithium ion, the sodium ion, and the potassium ion in the pigment ink when the pigment ink and the dye ink make contact with each other. The method for adjusting the total ion concentration of the lithium ion, the potassium ion, and the sodium ion in the pigment ink to be not less than 60 ppm may include, for example, a method in which lithium chloride, sodium chloride, or potassium chloride is added into the pigment ink. The pigment ink may contain only one of, or only two of the lithium ion, the potassium ion, and the sodium ion. Alternatively, the pigment ink may contain the three ions.

In the pigment ink described above, the total ion concentration of the divalent or multivalent metal ion or ions is not more than 10 ppm. In the pigment ink described above, it is necessary that the pigment is prevented from any occurrence of coagulation in order to maintain the dispersion stability of the pigment as the coloring agent. The dispersion stability of the pigment in the pigment ink is affected by the type and the concentration of the metal ion. For example, if any monovalent metal ion such as sodium ion and potassium ion, any divalent metal ion such as calcium ion and magnesium ion, and any trivalent or multivalent metal ion such as aluminum ion and titanium ion are excessively contained in the pigment ink, then the metal ion is bound to the negative charge on the pigment surface because the metal ion as described above has the positive charge, and the electric charge becomes zero. As a result, the electric repulsive force of the pigment is lost, the dispersion becomes unstable, and the coagulation occurs. In particular, the divalent or multivalent metal ion has an extremely large effect to destabilize the dispersion state of the pigment as compared with the monovalent metal ion. Therefore, even if the divalent or multivalent metal ion exists in an extremely minute amount as compared with the monovalent metal ion, the dispersion state of the pigment is harmfully affected. Therefore, if the ion concentration of the divalent or multivalent metal ion exceeds 10 ppm, then the dispersion of the pigment becomes unstable, and the coagulation takes place. In the pigment ink, it is preferable that the divalent or multivalent metal ion has a total ion concentration of not more than 5 ppm and especially not more than 2 ppm.

The reason, why the divalent or multivalent metal ion has the extremely large effect to destabilize the dispersion state of the pigment as compared with the monovalent metal ion, can be explained in accordance with the Schulze-Hardy's law. According to the Schulze-Hardy's law, the coagulation, which is caused when an electrolyte is added to a hydrophobic sol, is affected by only the colloid particles and the ion having the opposite charge, wherein as the ion valency is lager, the coagulating effect appears more conspicuously. According to this law, the divalent ion has the coagulating force which is 20 to 80 times that of the monovalent ion, the trivalent ion has the coagulating force which is square of that of the divalent ion, and the tetravalent or multivalent ion has the coagulating force which is much larger than the above.

The divalent or multivalent metal ion as described above may include, for example, barium ion, magnesium ion, calcium ion, zinc ion, iron ion, copper ion, chromium ion, aluminum ion, nickel ion, cobalt ion, manganese ion, lead ion, stannum ion, titanium ion, and zirconium ion. The method for reducing the ion concentration of the divalent or multivalent metal ion as described above may include, for example, a treatment in which the pigment ink is allowed to pass through a cation exchange resin.

It is preferable that the pigment ink contains polyvinylpyrrolidone having weight average molecular weights of 10,000 to 40,000 by 0.5 to 2% by weight. The polyvinylpyrrolidone having weight average molecular weights of 10,000 to 40,000 is capable of stabilizing the dispersion state of the pigment contained in the pigment ink by the effect of steric hindrance. As a result, when the pigment ink and the dye ink are subjected to the contact and the mixing, then the suppressing force is further enhanced against the coagulation of the pigment, and it is possible to avoid, for example, the clog-up at the head nozzle of the printer and the malfunction of the suction pump. The polyvinylpyrrolidone having weight average molecular weights of 10,000 to 40,000 may include, for example, polyvinylpyrrolidone K15, polyvinylpyrrolidone K17, polyvinylpyrrolidone K25, and polyvinylpyrrolidone K30. However, there is no limitation thereto.

It is preferable that the content of the polyvinylpyrrolidone having weight average molecular weights of 10,000 to 40,000 is 0.5 to 2% by weight. If the content is less than 0.5% by weight, the dispersion property of the pigment contained in the pigment ink cannot be stabilized sufficiently in some cases. If the content exceeds 2% by weight, inconveniences sometimes occur, for example, such that the viscosity of the pigment ink is unnecessarily increased, the discharge failure is caused, and the ink is dried extremely slowly on the recording paper.

The dye ink contains the dye as the coloring agent. Those usable as the dye include, for example, water-soluble dyes such as direct dyes and acid dyes. Specifically, for example, there may be exemplified Color Index No. Acid Blue 9, 22, 40, 59, 93, 102, 104, 113, 117, 120, 167, 229, and 234; Color Index No. Acid Red 1, 6, 32, 37, 51, 52, 80, 85, 87, 92, 94, 115, 181, 256, 289, 315, and 317; Color Index No. Acid Yellow 11, 17, 23, 25, 29, 42, 61, and 71; Color Index No. Acid Orange 7 and 19; Color Index No. Acid Violet 49; Color Index No. Direct Blue 6, 22, 25, 71, 86, 90, 106, and 199; Color Index No. Direct Red 1, 4, 17, 28, 83, and 227; Color Index No. Direct Yellow 12, 24, 26, 86, 98, 132, and 142; Color Index No. Direct Orange 34, 39, 44, 46, and 60; Color Index No. Direct Violet 47 and 48; Color Index No. Direct Brown 109; and Color Index No. Direct Green 59. However, there is no limitation to the dyes as described above. Each of the dyes as described above may be used singly. Alternatively, two or more of the dyes as described above may be used in combination.

In general, the counter ion is sodium ion and/or potassium ion, for example, in the direct dye and the acid dye to be used as the dye as described above. However, in the present invention, it is preferable that the counter ion is substituted with lithium ion. The lithium ion is a monovalent metal ion. Therefore, the polarized water molecules surround and cover the lithium ions in the water base ink for ink-jet recording to form loose clusters. However, the lithium ion has a relatively small ion radius of 0.60 angstrom, and hence the amount of adsorption of water molecules per one electric charge (ion valency) is small. For this reason, it is considered that the binding force per one water molecule is strengthened, and the water molecules are not easily disengaged from the lithium ion. Therefore, even when the lithium ion approaches the pigment surface having the negative electric charge in the pigment ink when the pigment ink and the dye ink are subjected to the contact and the mixing with each other, then the water molecule enters between the both, the effect to inhibit the binding is relatively increased, and the pigment is hardly bonded to the lithium ion. Consequently, it is considered that the electric repulsive force of the pigment is not lost, and hence the dispersion stability of the pigment is maintained.

On the other hand, the sodium ion has a relatively large ion radius of 0.95 angstrom. Therefore, the amount of adsorption of water molecules per one electric charge is large. For this reason, it is considered that the binding force per one water molecule is weakened, and the water molecules are easily disengaged due to the Brownian motion and the external force exerted by any external electric field or the like. Therefore, when the sodium ion approaches the pigment surface having the negative charge, the water molecules fail to enter therebetween to inhibit the binding between the both, resulting in the disengagement. Consequently, the pigment is bonded to the sodium ion, and the electric charge becomes zero. Accordingly, the electric repulsive force of the pigment is lost, and the dispersion becomes unstable to cause the coagulation. The ion radius of the potassium ion is 1.33 angstroms, which is larger than that of the sodium ion. Therefore, the pigment coagulation is caused for the same reason as that for the sodium ion. The size of the water molecule is 1.3 to 1.4 angstroms. The distance of O—H bond is 0.96 angstrom, and the angle of H—O—H bond is 104.5 degrees.

It is preferable that the content of the dye is 0.5 to 20% by weight. The content is more preferably 0.3 to 15% by weight and much more preferably 0.5 to 10% by weight. The dye contains many cations as impurities. Therefore, it is preferable to use those in which the impurities are removed by purification. As for the purification method, Japanese Patent Application Laid-open No. 9-25441 discloses a specified method for removing potassium ion or the like. The purification can be performed in accordance with any method similar thereto. However, there is no limitation to the method as described above.

The dye ink contains at least one ion of the lithium ion, the potassium ion, and the sodium ion, and the total ion concentration thereof is not more than 1,800 ppm and preferably not more than 1,700 ppm. If the total ion concentration exceeds 1,800 ppm, then the lithium ion, the potassium ion, and the sodium ion as the impurities other than the counter ion are bound to the dye molecules having the negative charge, and the electric charge becomes zero. As a result, salts are formed, and the dye molecules are deposited. The method for adjusting the total ion concentration of the lithium ion, the potassium ion, and the sodium ion in the dye ink to be not more than 1,800 ppm may include, for example, a treatment in which the dye ink is allowed to pass through a cation exchange resin. Further, the atomic weight of lithium is smaller than those of sodium and potassium. Therefore, when the counter ion is subjected to the substitution with lithium, it is possible to decrease the total ion concentration of the lithium ion, the potassium ion, and the sodium ion in the dye ink. The dye ink may contain only one of, or only two of the lithium ion, the potassium ion, and the sodium ion. Alternatively, the dye ink may contain the three ions.

In the dye ink, the total ion concentration of the divalent or multivalent metal ion is not more than 10 ppm. As for the dye ink, it is necessary that no deposition of the dye is caused in order to maintain the dissolution stability of the acid dye and the direct dye as the coloring agent. The dissolution stability of the dye in the dye ink is affected by the type and the concentration of the metal ion. For example, if any monovalent metal ion such as sodium ion and potassium ion, any divalent metal ion such as calcium ion and magnesium ion, and any trivalent or multivalent metal ion such as aluminum ion and titanium ion are excessively contained in the dye ink, then the negative electric charge of the dye is bound to the metal ion, because the metal ions as described above have the positive electric charge. As a result, the electric charge becomes zero, the dissolution becomes unstable thereby, and the deposition takes place. In particular, the divalent or multivalent metal ion has an extremely large effect to destabilize the dissolution state of the dye as compared with the monovalent metal ion. Therefore, even when the amount is extremely minute, the divalent or multivalent metal ion harmfully affects the dissolution state of the dye as compared with the monovalent metal ion. Therefore, if the ion concentration of the divalent or multivalent metal ion exceeds 10 ppm, then the dissolution state of the dye becomes unstable, and the deposition occurs. It is preferable that the total concentration of the divalent or multivalent metal ion is not more than 5 ppm and especially not more than 2 ppm in the dye ink.

The reason, why the divalent or multivalent metal ion has the extremely large effect to destabilize the dissolution state of the dye as compared with the monovalent metal ion, is the same as that for the pigment ink as described above.

The divalent or multivalent metal ion may include, for example, barium ion, magnesium ion, calcium ion, zinc ion, iron ion, copper ion, chromium ion, aluminum ion, nickel ion, cobalt ion, manganese ion, lead ion, stannum ion, titanium ion, and zirconium ion.

In the water base ink set for ink-jet recording of the present invention, the total ion concentration of the lithium ion, the potassium ion, and the sodium ion in the dye ink is not more than 25 times the total ion concentration of the lithium ion, the potassium ion, and the sodium ion in the pigment ink. If the total ion concentration in the dye ink is more than 25 times the total ion concentration in the pigment ink, then the dispersion stability of the pigment in the pigment ink is harmfully affected, and the dispersion stability of the pigment is deteriorated, because the difference in the total ion concentration of the lithium ion, the potassium ion, and the sodium ion between the respective inks is too large, when the pigment ink and the dye ink are subjected to the contact and the mixing with each other. It is preferred that the total ion concentration of the lithium ion, the potassium ion, and the sodium ion in the dye ink is not less than 3 times the total ion concentration of the lithium ion, the potassium ion, and the sodium ion in the pigment ink. If the total ion concentration in the dye ink is less than 3 times the total ion concentration in the pigment ink, the dispersibility of the pigment and the solubility of the dye tend to be deteriorated when the pigment ink and the dye ink exist singly respectively.

The pigment ink and the dye ink contain water. As for the water, it is preferable to use those having high purities such as ion exchange water, distilled water, pure water, and ultra pure water other than ordinary water. It is preferable that the content of water is 10 to 98% by weight with respect to the total weight of the ink. The content of water is more preferably 30 to 97% by weight and much more preferably 40 to 95% by weight. Within the range as described above, it is possible that the pigment ink and the dye ink can be maintained to have low viscosities at which they can be jetted normally.

The pigment ink and the dye ink contain the water-soluble organic solvent. The water-soluble organic solvent is principally used in order to avoid the drying-up and the occurrence of deposition from the ink at the tip of the ink-jet head. The water-soluble organic solvent is not specifically limited. However, it is preferable to use those having low volatility and high dye solubility. The water-soluble organic solvent may include, for example, polyalkylene glycols such as polyethylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; glycerol; and pyrrolidones such as 2-pyrrolidone and N-methyl-2-pyrrolidone. The water-soluble organic solvent as described above may be used singly. Alternatively, two or more of the water-soluble organic solvents as described above may be used in combination.

It is preferable that the content of the water-soluble organic solvent is 5 to 40% by weight. If the content is less than 5% by weight, then the moistening function is insufficient, and any problem concerning the deposition and the drying-up may arise in some cases. If the content exceeds 40% by weight, the viscosity of the water base ink for ink-jet recording of the present invention is unnecessarily increased. As a result, any problem may arise in some cases such that the discharge cannot be performed and/or the ink is dried on the recording paper extremely slowly. The content is more preferably 7 to 40% by weight and much more preferably 10 to 35% by weight.

Polyvalent alcohol mono alkyl ether may be used, if necessary, in order to control the permeability. The polyvalent alcohol mono alkyl ether improves the quick drying property of the ink on the paper surface by effectively quickening the permeation speed of the ink into the recording paper, making it possible to avoid the bleeding (blurring at the boundary between different colors) caused by the slow drying property on the recording paper and avoid the feathering (whisker-like blurring caused along the paper fiber) associated with the permeation. The polyvalent alcohol mono alkyl ether may include, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

It is preferable that the content of the polyvalent alcohol alkyl ether is 0.3 to 15% by weight. If the content is less than 0.3% by weight, any problem concerning the drying time and the blurring may arise in some cases, because the permeation speed of the ink into the recording paper is slow. If the content exceeds 15% by weight, any problem may arise in some cases such that the water base ink for ink-jet recording of the present invention arrives at the back of the recording paper and/or the blurring occurs, because the permeation speed of the ink into the recording paper is too fast. More preferably, the content is 0.5 to 10% by weight. It is also possible to use monovalent alcohol such as ethanol and isopropyl alcohol in order to control the performance of drying and permeation of the ink into the printing medium.

The water base ink set for ink-jet recording of the present invention is basically constructed as described above. Other than the above, it is also possible to add, if necessary, conventionally known resin binders, dispersing agents, surfactants, viscosity-adjusting agents, surface tension-adjusting agents, pH-adjusting agents, dye-dissolving agents, antiseptic/fungicidal agents, and rustproofing or rust preventing agents.

When the water base ink set for ink-jet recording of the present invention is applied to the ink-jet system in which the ink is discharged in accordance with the action of the thermal energy, thermal physical values including, for example, the specific heat, the coefficient of thermal expansion, and the coefficient of thermal conductivity are adjusted in some cases.

Figure 2:
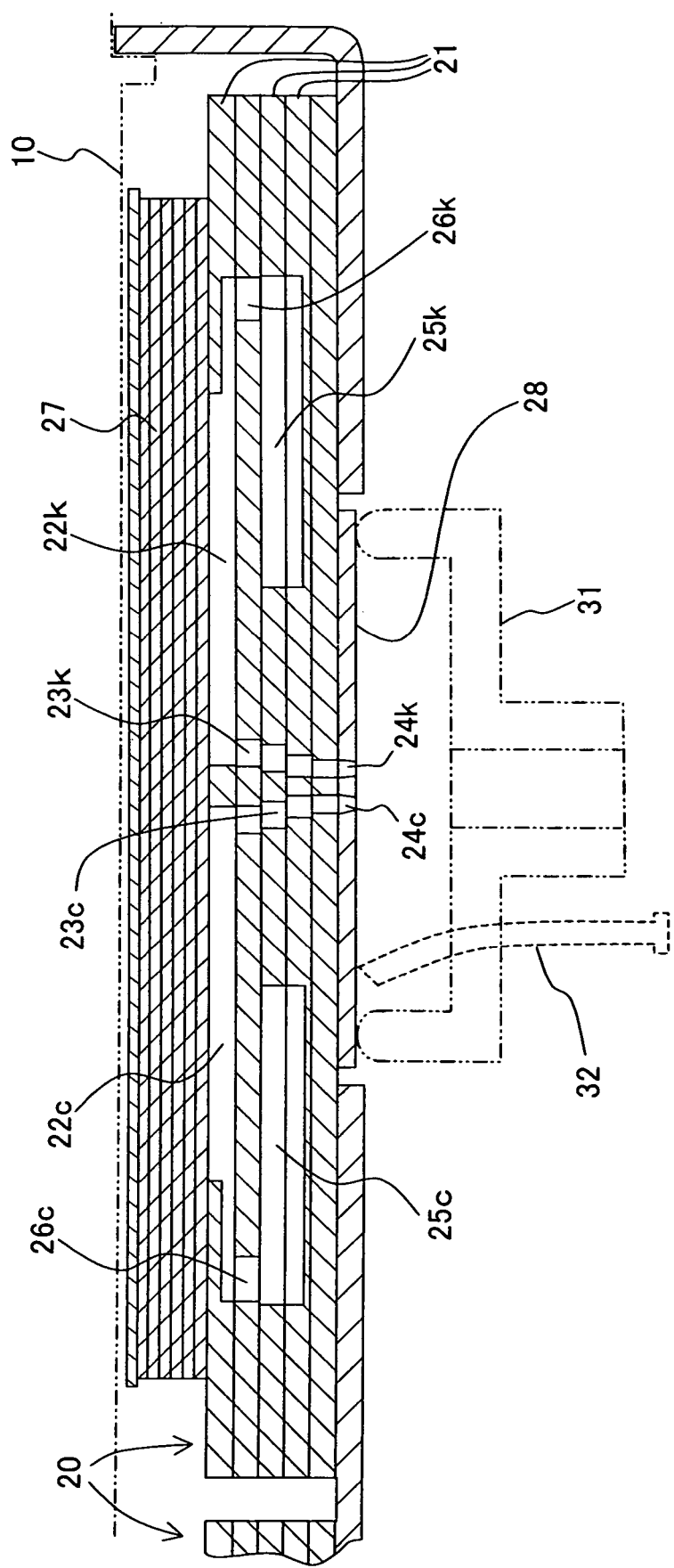
FIG. 2 shows a sectional view as viewed in a front direction illustrating an internal structure of a printing head.

The water base ink set for ink-jet recording of the present invention is preferably usable for an ink-jet recording apparatus having a structure as shown in FIGS. 1 and 2. The ink-jet recording apparatus has a maintenance unit comprising a wiper which collectively wipes nozzles for respective colors of a printing head, a suction cap which is capable of making contact and separation with respect to the nozzle surface, a suction pump which sucks the ink by the aid of the suction cap, and a drain tank which stores the drain discharged from the suction pump, wherein the pigment ink and the dye ink are mixed with each other in the maintenance unit. The structure or arrangement of the ink-jet recording apparatus shown in FIGS. 1 and 2 is basically the same as that of an ink-jet printer MFC-3100C (produced by Brother Industries, Ltd.) used in the ink evaluation as described later on.

As shown in FIG. 1, the printing heads 20 are carried on a carriage 10. The printing heads 20 are moved along a shaft 12 in parallel to a recording objective material (printing paper) disposed on a printing paper transport section 13. Ink droplets are discharged from the printing head 20 onto the printing paper. Four ink cartridges 11, which contain a black ink, a yellow ink, a magenta ink, and a cyan ink respectively, are installed on the carriage 10. The black ink and the cyan ink are supplied to one printing head of the two printing heads 20 respectively, and the yellow ink and the magenta ink are supplied to the other printing head respectively. As shown in FIG. 2, a plurality of nozzles 24k for discharging the black ink and a plurality of nozzles 24c for discharging the cyan ink, which form arrays in a direction perpendicular to the paper surface of FIG. 2, are provided at the lower surface (nozzle surface) 28 of the former printing head 20. Nozzles for discharging the yellow ink and the magenta ink are also provided for the latter printing head 20 in the same manner as described above.

Each of the printing heads 20 is constructed in the same manner as the disclosure in Japanese Patent Application Laid-open No. 2001-246744. The inks, which are supplied from the respective ink cartridges, pass through communication holes 26k, 26c via common ink chambers 25k, 25c which are independent for the respective nozzle arrays, and the inks are distributed to pressure-generating chambers 22k, 22c which are independent for the respective nozzles. The pressure is applied by a piezoelectric actuator 27 to the inks contained in the respective pressure-generating chambers 22k, 22c. The inks pass through communication holes 23k, 23c, and they are discharged from the respective nozzles 24k, 24c. The respective chambers 25k, 25c, 22k, 22c and the respective holes 26k, 26c, 23k, 23c are formed as openings which are formed through a plurality of metal plate members 21, and they are communicated with each other by stacking the plate members 21. The plate member, which forms the nozzle surface 28, is formed of a synthetic resin material (polyimide), and a water-repellent film is formed on the surface.

A unit, which is indicated by reference numeral 30 in FIG. 1, is called "maintenance unit". A restoring treatment is applied to the printing head 20 periodically or when any discharge failure occurs in the printing head 20. When the carriage 10 is moved to a position deviated from the printing paper transport section 13, then the suction cap 31 approaches one printing head 20 by the aid of a cam 33, and the suction cap 31 covers the nozzles 24k, 24c to make tight contact with the nozzle surface 28. When the suction pump 34 is driven, then the inks contained in the two arrays of the nozzles 24k, 24c are simultaneously sucked by the aid of the suction cap 31, and the inks are discharged to the drain tank 35. After that, the suction cap 31 is separated from the nozzle surface 28. When it is necessary to perform the restoring treatment for the nozzles for the yellow ink and the magenta ink as well, the carriage 10 moves the nozzles for the yellow ink and the magenta ink to positions opposed to the suction cap 31 to repeat the same or equivalent operation. After that, when the wiper 32 approaches the printing head 20 by the aid of the cam 33, and the carriage 10 is moved along the shaft 12, then the wiper 32 collectively wipes, in the horizontal direction in the drawing, the nozzle surface 28 on which the nozzles 24k, 24c for the black ink and the cyan ink are open and the nozzle surface on which the nozzles for the yellow ink and the magenta ink are open. When the ink-jet printer pauses or stops, then the carriage 10 is moved to the position at which the two printing heads 20 are opposed to the storage caps 36 respectively, and all of the nozzles are covered with the storage caps 36. The structure of the ink jet printer is disclosed, for example, in Japanese Laid-Open Patent Publication No. 2002-234151 corresponding to U.S. Pat. No. 6,631,974 which content is incorporated herein by reference.

EXAMPLES

The present invention will be explained in further detail below as exemplified by Examples. However, the present invention is not limited to only Examples.

Example 1

A water base ink set for ink-jet recording having compositions shown in Table 1 was prepared by using a pigment ink as a black ink and using dye inks as a yellow ink, a magenta ink, and a cyan ink. Lithium chloride was contained in the pigment ink in order to adjust the total amount of the ion concentrations of lithium ion, sodium ion, and potassium ion. Purified materials of direct and acid dyes were used for the dyes.

TABLE 1

| | Ink set of Example 1 | | | |
| --- | --- | --- | --- | --- |
| | Pigment ink (black) | Dye ink (yellow) | Dye ink (magenta) | Dye ink (cyan) |
| CAB-O-JET 300, solid content: 15% by weight (produced by Cabot) | 33.3 | — | — | — |
| Lithium chloride | 0.008 | — | — | — |
| Glycerol | 28 | 30 | 32 | 31 |
| Triethylene glycol n-butyl ether | 5 | 5 | 5 | 5 |
| C. I. Direct Yellow 132 (purified material) | — | 3 | — | — |
| C. I. Acid Red 52 (purified material) | — | — | 2 | — |
| C. I. Acid Red 289 (purified material) | — | — | 1.5 | — |
| C. I. Direct Blue 199 (purified material) | — | — | — | 3 |
| Pure water | 33.692 | 62 | 59.5 | 61 | unit: % by weight

Example 2

A water base ink set for ink-jet recording having compositions shown in Table 2 was prepared by using a pigment ink as a black ink and using dye inks as a yellow ink, a magenta ink, and a cyan ink. Sodium chloride was contained in the pigment ink in order to adjust the total amount of the ion concentrations of lithium ion, sodium ion, and potassium ion. Those in which the counter ion was substituted with lithium ion were used for the dyes.

TABLE 2

|  | Ink set of Example 2 | | | |
| --- | --- | --- | --- | --- |
|  | Pigment ink (black) | Dye ink (yellow) | Dye ink (magenta) | Dye ink (cyan) |
| CAB-O-JET 300, solid content: 15% by weight (produced by Cabot) | 33.3 | — | — | — |
| Sodium chloride | 0.01 | — | — | — |
| Glycerol | 20 | 30 | 32 | 31 |
| Diethylene glycol | 7 | — | — | — |
| Triethylene glycol n-butyl ether | 3 | 5 | 5 | 5 |
| C. I. Direct Yellow 86 (substituted with Li) | — | 3 | — | — |
| C. I. Acid Red 52 (substituted with Li) | — | — | 3 | — |
| C. I. Direct Blue 199 (substituted with Li) | — | — | — | 3.5 |
| Pure water | 36.69 | 62 | 60 | 60.5 | unit: % by weight

Example 3

A water base ink set for ink-jet recording having compositions shown in Table 3 was prepared by using a pigment ink as a black ink and using dye inks as a yellow ink, a magenta ink, and a cyan ink. Potassium chloride was contained in the pigment ink in order to adjust the total amount of the ion concentrations of lithium ion, sodium ion, and potassium ion. Purified materials of direct and acid dyes were used for the dyes.

TABLE 3

|  | Ink set of Example 3 | | | |
| --- | --- | --- | --- | --- |
|  | Pigment ink (black) | Dye ink (yellow) | Dye ink (magenta) | Dye ink (cyan) |
| CAB-O-JET 200, solid content: 15% by weight (produced by Cabot) | 33.3 | — | — | — |
| Potassium chloride | 0.007 | — | — | — |
| Glycerol | 28 | 29 | 30 | 31 |
| Triethylene glycol n-butyl ether | 4 | 5 | 5 | 5 |
| Olfin E1010 (produced by Nissin Chemical Industry Co., Ltd.) | — | 0.3 | 0.3 | 0.2 |
| C. I. Direct Yellow 132 (purified material) | — | 3 | — | — |
| C. I. Direct Red 227 (purified material) | — | — | 2.5 | — |
| C. I. Acid Blue 9 (purified material) | — | — | — | 3 |
| Pure water | 34.693 | 62.7 | 62.2 | 60.8 | unit: % by weight

Example 4

A water base ink set for ink-jet recording having compositions shown in Table 4 was prepared by using a pigment ink as a black ink and using dye inks as a yellow ink, a magenta ink, and a cyan ink. Potassium chloride and polyvinylpyrrolidone K15 were contained in the pigment ink. Those in which the counter ion was substituted with lithium ion were used for the dyes.

TABLE 4

|  | Ink set of Example 4 | | | |
| --- | --- | --- | --- | --- |
|  | Pigment ink (black) | Dye ink (yellow) | Dye ink (magenta) | Dye ink (cyan) |
| CAB-O-JET 300, solid content: 15% by weight (produced by Cabot) | 33.3 | — | — | — |
| Potassium chloride | 0.007 | — | — | — |
| Polyvinylpyrrolidone K15 | 2 | — | — | — |
| Glycerol | 20 | 26 | 28 | 28 |
| Triethylene glycol n-butyl ether | 5 | 7 | 7 | 7 |
| Olfin E1010 (produced by Nissin Chemical Industry Co., Ltd.) | — | 0.3 | 0.3 | 0.2 |
| C. I. Direct Yellow 132 (substituted with Li) | — | 3 | — | — |
| C. I. Direct Red 227 (substituted with Li) | — | — | 2.5 | — |
| C. I. Direct Blue 9 (substituted with Li) | — | — | — | 3 |
| Pure water | 39.693 | 63.7 | 62.2 | 61.8 | unit: % by weight

Example 5

A water base ink set for ink-jet recording having compositions shown in Table 5 was prepared by using a pigment ink as a black ink and using dye inks as a yellow ink, a magenta ink, and a cyan ink. Sodium chloride and polyvinylpyrrolidone K30 were contained in the pigment ink. Those in which the counter ion was substituted with lithium ion were used for the dyes.

TABLE 5

|  | Ink set of Example 5 | | | |
| --- | --- | --- | --- | --- |
|  | Pigment ink (black) | Dye ink (yellow) | Dye ink (magenta) | Dye ink (cyan) |
| CAB-O-JET 200, solid content: 15% by weight (produced by Cabot) | 33.3 | — | — | — |
| Sodium chloride | 0.005 | — | — | — |
| Polyvinylpyrrolidone K30 | 0.7 | — | — | — |
| Glycerol | 22 | 25 | 26 | 27 |
| Triethylene glycol n-butyl ether | 4 | 8 | 8 | 8 |
| C. I. Direct Yellow 132 (substituted with Li) | — | 3 | — | — |
| C. I. Acid Red 52 (substituted with Li) | — | — | 1 | — |
| C. I. Acid Red 289 (substituted with Li) | — | — | 1.5 | — |
| C. I. Direct Blue 199 (substituted with Li) | — | — | — | 3 |
| Pure water | 39.995 | 64 | 63.5 | 62 | unit: % by weight

Comparative Example 1

A water base ink set for ink-jet recording having compositions shown in Table 6 was prepared by using a pigment ink as a black ink and using dye inks as a yellow ink, a magenta ink, and a cyan ink. Lithium chloride was contained in the pigment ink.

TABLE 6

| | Ink set of Comparative Example 1 | | | |
|---|---|---|---|---|
| | Pigment ink (black) | Dye ink (yellow) | Dye ink (magenta) | Dye ink (cyan) |
| CAB-O-JET 300, solid content: 15% by weight (produced by Cabot) | 33.3 | — | — | — |
| Lithium chloride | 0.008 | — | — | — |
| Glycerol | 28 | 30 | 32 | 31 |
| Triethylene glycol n-butyl ether | 5 | 5 | 5 | 5 |
| C. I. Direct Yellow 132 | — | 3 | — | — |
| C. I. Acid Red 52 | — | — | 2 | — |
| C. I. Acid Red 289 | — | — | 1.5 | — |
| C. I. Direct Blue 199 | — | — | — | 3 |
| Pure water | 33.692 | 62 | 59.5 | 61 | unit: % by weight

Comparative Example 2

A water base ink set for ink-jet recording having compositions shown in Table 7 was prepared by using a pigment ink as a black ink and using dye inks as a yellow ink, a magenta ink, and a cyan ink. A purified material of CAB-O-JET 300 was used for the pigment.

TABLE 7

| | Ink set of Comparative Example 2 | | | |
|---|---|---|---|---|
| | Pigment ink (black) | Dye ink (yellow) | Dye ink (magenta) | Dye ink (cyan) |
| CAB-O-JET 300, solid content: 15% by weight (purified material) (produced by Cabot) | 33.3 | — | — | — |
| Glycerol | 20 | 30 | 32 | 31 |
| Triethylene glycol n-butyl ether | 5 | 5 | 5 | 5 |
| C. I. Direct Yellow 132 | — | 3 | — | — |
| C. I. Acid Red 52 | — | — | 2 | — |
| C. I. Acid Red 289 | — | — | 1.5 | — |
| C. I. Direct Blue 199 | — | — | — | 3 |
| Pure water | 41.7 | 62 | 59.5 | 61 | unit: % by weight

Comparative Example 3

A water base ink set for ink-jet recording having compositions shown in Table 8 was prepared by using a pigment ink as a black ink and using dye inks as a yellow ink, a magenta ink, and a cyan ink. A purified material of CAB-O-JET 300 was used for the pigment, and polyvinylpyrrolidone K15 was contained therein. Purified materials of direct and acid dyes were used for the dyes.

TABLE 8

| | Ink set of Comparative Example 3 | | | |
|---|---|---|---|---|
| | Pigment ink (black) | Dye ink (yellow) | Dye ink (magenta) | Dye ink (cyan) |
| CAB-O-JET 300, solid content: 15% by weight (purified material) (produced by Cabot) | 33.3 | — | — | — |
| Polyvinyl pyrrolidone K15 | 2 | — | — | — |
| Glycerol | 20 | 30 | 32 | 31 |
| Triethylene glycol n-butyl ether | 5 | 5 | 5 | 5 |
| C. I. Direct Yellow 132 (purified material) | — | 3 | — | — |
| C. I. Acid Red 52 (purified material) | — | — | 2 | — |
| C. I. Acid Red 289 (purified material) | — | — | 1.5 | — |
| C. I. Direct Blue 199 (purified material) | — | — | — | 3 |
| Pure water | 39.7 | 62 | 59.5 | 61 | unit: % by weight

Comparative Example 4

A water base ink set for ink-jet recording having compositions shown in Table 9 was prepared by using a pigment ink as a black ink and using dye inks as a yellow ink, a magenta ink, and a cyan ink. Lithium chloride and polyvinyl pyrrolidone K15 were contained in the pigment ink.

TABLE 9

| | Ink set of Comparative Example 4 | | | |
|---|---|---|---|---|
| | Pigment ink (black) | Dye ink (yellow) | Dye ink (magenta) | Dye ink (cyan) |
| CAB-O-JET 300, solid content: 15% by weight (produced by Cabot) | 33.3 | — | — | — |
| Lithium chloride | 0.008 | — | — | — |
| Polyvinyl pyrrolidone K15 | 2 | — | — | — |
| Glycerol | 20 | 30 | 32 | 31 |
| Triethylene glycol n-butyl ether | 5 | 5 | 5 | 5 |
| C. I. Direct Yellow 132 | — | 3 | — | — |
| C. I. Acid Red 52 | — | — | 2 | — |
| C. I. Acid Red 289 | — | — | 1.5 | — |
| C. I. Direct Blue 199 | — | — | — | 3 |
| Pure water | 39.692 | 62 | 59.5 | 61 | unit: % by weight

Comparative Example 5

A water base ink set for ink-jet recording having compositions shown in Table 10 was prepared by using a pigment ink as a black ink and using dye inks as a yellow ink, a magenta ink, and a cyan ink. A purified material of CAB-O-JET 300 was used for the pigment.

TABLE 10

| | Ink set of Comparative Example 5 | | | |
|---|---|---|---|---|
| | Pigment ink (black) | Dye ink (yellow) | Dye ink (magenta) | Dye ink (cyan) |
| CAB-O-JET 300, solid content: 15% by weight (purified material) (produced by Cabot) | 33.3 | — | — | — |

TABLE 10-continued

| | Ink set of Comparative Example 5 | | | |
|---|---|---|---|---|
| | Pigment ink (black) | Dye ink (yellow) | Dye ink (magenta) | Dye ink (cyan) |
| Glycerol | 20 | 30 | 32 | 30 |
| Diethylene glycol | 7 | — | — | — |
| Triethylene glycol n-butyl ether | 3 | 5 | 5 | 5 |
| C. I. Direct Yellow 86 | — | 3 | — | — |
| C. I. Acid Red 52 | — | — | 3.5 | — |
| C. I. Direct Blue 199 | — | — | — | 3.5 |
| Pure water | 36.7 | 62 | 59.5 | 61.5 | unit: % by weight

Comparative Example 6

A water base ink set for ink-jet recording having compositions shown in Table 11 was prepared by using a pigment ink as a black ink and using dye inks as a yellow ink, a magenta ink, and a cyan ink. Potassium chloride was contained in the pigment ink.

TABLE 11

| | Ink set of Comparative Example 6 | | | |
|---|---|---|---|---|
| | Pigment ink (black) | Dye ink (yellow) | Dye ink (magenta) | Dye ink (cyan) |
| CAB-O-JET 200, solid content: 15% by weight (produced by Cabot) | 33.3 | — | — | — |
| Potassium chloride | 0.007 | — | — | — |
| Glycerol | 28 | 29 | 30 | 31 |
| Triethylene glycol n-butyl ether | 4 | 5 | 5 | 5 |
| Olfin E1010 (produced by Nissin Chemical Industry Co., Ltd.) | — | 0.3 | 0.3 | 0.2 |
| C. I. Direct Yellow 132 | — | 3 | — | — |
| C. I. Direct Red 227 | — | — | 2.5 | — |
| C. I. Acid Blue 9 | — | — | — | 3 |
| Pure water | 34.693 | 62.7 | 62.2 | 60.8 | unit: % by weight

Comparative Example 7

A water base ink set for ink-jet recording having compositions shown in Table 12 was prepared by using a pigment ink as a black ink and using dye inks as a yellow ink, a magenta ink, and a cyan ink. Potassium chloride and polyvinylpyrrolidone K15 were contained in the pigment ink.

TABLE 12

| | Ink set of Comparative Example 7 | | | |
|---|---|---|---|---|
| | Pigment ink (black) | Dye ink (yellow) | Dye ink (magenta) | Dye ink (cyan) |
| CAB-O-JET 300, solid content: 15% by weight (produced by Cabot) | 33.3 | — | — | — |
| Potassium chloride | 0.007 | — | — | — |
| Polyvinylpyrrolidone K15 | 2 | — | — | — |
| Glycerol | 20 | 26 | 28 | 28 |
| Triethylene glycol n-butyl ether | 5 | 7 | 7 | 7 |

TABLE 12-continued

| | Ink set of Comparative Example 7 | | | |
|---|---|---|---|---|
| | Pigment ink (black) | Dye ink (yellow) | Dye ink (magenta) | Dye ink (cyan) |
| Olfin E1010 (produced by Nissin Chemical Industry Co., Ltd.) | — | 0.3 | 0.3 | 0.2 |
| C. I. Direct Yellow 132 | — | 3 | — | — |
| C. I. Direct Red 227 | — | — | 2.5 | — |
| C. I. Direct Blue 9 | — | — | — | 3 |
| Pure water | 39.693 | 63.7 | 62.2 | 61.8 | unit: % by weight

Comparative Example 8

A water base ink set for ink-jet recording having compositions shown in Table 13 was prepared by using a pigment ink as a black ink and using dye inks as a yellow ink, a magenta ink, and a cyan ink. Polyvinylpyrrolidone K30 was contained in the pigment ink. Those in which the counter ion was substituted with lithium ion were used for the dyes.

TABLE 13

| | Ink set of Comparative Example 8 | | | |
|---|---|---|---|---|
| | Pigment ink (black) | Dye ink (yellow) | Dye ink (magenta) | Dye ink (cyan) |
| CAB-O-JET 200, solid content: 15% by weight (purified material) (produced by Cabot) | 33.3 | — | — | — |
| Polyvinylpyrrolidone K30 | 0.7 | — | — | — |
| Glycerol | 22 | 25 | 26 | 27 |
| Triethylene glycol n-butyl ether | 4 | 8 | 8 | 8 |
| C. I. Direct Yellow 132 (substituted with Li) | — | 3 | — | — |
| C. I. Acid Red 52 (substituted with Li) | — | — | 1 | — |
| C. I. Acid Red 289 (substituted with Li) | — | — | 1.5 | — |
| C. I. Direct Blue 199 (substituted with Li) | — | — | — | 3 |
| Pure water | 40 | 64 | 63.5 | 62 | unit: % by weight

Evaluation

The pigment inks and the dye inks of the water base ink sets for ink-jet recording prepared in Examples 1 to 5 and Comparative Examples 1 to 8 were sufficiently mixed and agitated respectively. After that, the inks were filtrated through a membrane filter of 0.8 μm to measure the ion concentrations of the lithium ion, the potassium ion, and the sodium ion and the total ion concentrations of the divalent or multivalent metal ion or ions by using an ion chromatography analyzer DX-500 (produced by Nippon Dionex Co., Ltd.). The total ion concentration of the lithium ion, the potassium ion, and the sodium ion, the total ion concentration of the divalent or multivalent metal ion or ions, and the value of (total ion concentration of lithium ion, potassium ion, and sodium ion of dye ink)/(total ion concentration of lithium ion, potassium ion, and sodium ion of pigment ink) are shown in Tables 14 and 15 for each of the pigment inks and the dye inks. The microscopic observation was carried out to perform the evaluation, and the nozzle clog-up and the suction pump durability were evaluated by the following methods for the water base ink sets for ink-jet recording described above. Obtained results are shown in Table 16.

(1) Microscopic observation: One droplet of the pigment ink and one droplet of each of the dye inks were dropped on a slide glass while they were separated from each other. A cover glass was stationarily placed on the four droplets to allow the four liquids to make contact with each other under the cover glass. After that, the contact surfaces between the contacted four liquids were microscopically observed to confirm whether or not the pigment was coagulated. According to this method, it is possible to confirm whether or not the coagulation occurs in a state more approximate to the actual mixed state on the nuzzle surface of the printing head and/or in the maintenance unit as compared with another coagulation test which is performed by mixing and agitating the pigment ink and the dye inks. The following evaluation criteria were adopted. +: No coagulation occurs at the contact interface. ±: The black pigment contained in the pigment ink is coagulated at the contact surface, but the fluidity is observed. –: The black pigment contained in the pigment ink is coagulated at the contact surface to cause the solidification at the interface, and no fluidity is observed.

(2) Nozzle clog-up: A wiping test was carried out for the head nozzle surface continuously 3,000 times at room temperature. An ink-jet printer MFC-3100C (produced by Brother Industries, Ltd.) was used for the evaluation. The ink-jet printer has the following structure. That is, the nozzle arrays for discharging the black ink and the color ink respectively are disposed approximately to one another. When all of the nozzle arrays on the head nozzle surface are collectively subjected to the wiping in the horizontal direction, the black ink and the color ink make contact with each other. The following evaluation criteria were adopted. +: The discharge failure and the bending after the wiping test are not observed at all even in the wiping test for the head nozzle surface performed continuously 3,000 times. ±: The discharge failure and the bending after the wiping test are slightly observed in the wiping test for the head nozzle surface performed continuously 3,000 times. However, both of the discharge failure and the bending are restored by the purge operation performed not more than 5 times. –: The discharge failure and the bending after the wiping test are frequently observed in the wiping test for the head nozzle surface performed continuously 3,000 times. Further, both of the discharge failure and the bending are not restored in a short period of time.

(3) Evaluation of suction pump durability: A continuous suction purge test was carried out 10,000 times at room temperature. An ink-jet printer MFC-3100C (produced by Brother Industries, Ltd.) was used for the evaluation. The following criteria were adopted. ++: The amount of suction per one time is within a range of 0.26 to 0.30 cc as the prescribed amount in the continuous suction purge performed 10,000 times. +: The amount of suction per one time is not more than 0.26 cc as the lower limit value of the prescribed amount in the continuous suction purge performed 10,000 times. However, the amount of suction per one time is within a range of 0.26 to 0.30 cc as the prescribed amount in the continuous suction purge performed 5,000 times. ±: The amount of suction per one time is not more than 0.26 cc as the lower limit value of the prescribed amount in the continuous suction purge performed 5,000 times. However, the amount of suction per one time is within a range of 0.26 to 0.30 cc as the prescribed amount in the continuous suction purge performed 3,000 times. –: The amount of suction per one time is not more than 0.26 cc as the lower limit value of the prescribed amount in the continuous suction purge performed 3,000 times. It is assumed that those which acquired the results of "++" and "+" in the evaluation as described above satisfy the acceptable level.

TABLE 14

|  |  | Pigment ink (black) | Dye ink (yellow) | Dye ink (magenta) | Dye ink (cyan) |
|---|---|---|---|---|---|
| Ex. 1 | Lithium ion (ppm) | 14 | 0 | 0 | 0 |
|  | Sodium ion (ppm) | 58 | 1635 | 1552 | 1595 |
|  | Potassium ion (ppm) | 2 | 2 | 4 | 1 |
|  | Total ion concentration (ppm) | 74 | 1637 | 1556 | 1596 |
|  | Ion concentration ratio (dye ink/pigment ink) | — | 22.1 | 21.0 | 21.6 |
|  | Ion concentration of divalent or multivalent metal ion or ions (ppm) | 1.2 | 0.7 | 0.9 | 1.1 |
| Ex. 2 | Lithium ion (ppm) | 0 | 365 | 415 | 564 |
|  | Sodium ion (ppm) | 95 | 7 | 5 | 8 |
|  | Potassium ion (ppm) | 2 | 2 | 3 | 1 |
|  | Total ion concentration (ppm) | 97 | 374 | 423 | 573 |
|  | Ion concentration ratio (dye ink/pigment ink) | — | 3.9 | 4.4 | 5.9 |
|  | Ion concentration of divalent or multivalent metal ion or ions (ppm) | 1.3 | 0.6 | 0.8 | 0.6 |
| Ex. 3 | Lithium ion (ppm) | 2 | 1 | 1 | 1 |
|  | Sodium ion (ppm) | 78 | 1623 | 1552 | 1121 |
|  | Potassium ion (ppm) | 35 | 3 | 2 | 1 |
|  | Total ion concentration (ppm) | 115 | 1627 | 1555 | 1123 |
|  | Ion concentration ratio (dye ink/pigment ink) | — | 14.1 | 13.5 | 9.8 |
|  | Ion concentration of divalent or multivalent metal ion or ions (ppm) | 1.1 | 1.2 | 0.8 | 0.7 |
| Ex. 4 | Lithium ion (ppm) | 1 | 430 | 431 | 346 |
|  | Sodium ion (ppm) | 61 | 12 | 5 | 4 |
|  | Potassium ion (ppm) | 37 | 3 | 7 | 1 |
|  | Total ion concentration (ppm) | 99 | 445 | 443 | 351 |
|  | Ion concentration ratio (dye ink/pigment ink) | — | 4.5 | 4.5 | 3.5 |
|  | Ion concentration of divalent or multivalent metal ion or ions (ppm) | 1.3 | 1.1 | 0.8 | 0.7 |
| Ex. 5 | Lithium ion (ppm) | 1 | 468 | 389 | 482 |
|  | Sodium ion (ppm) | 82 | 15 | 12 | 9 |
|  | Potassium ion (ppm) | 0 | 3 | 2 | 1 |
|  | Total ion concentration (ppm) | 83 | 486 | 403 | 492 |
|  | Ion concentration ratio (dye ink/pigment ink) | — | 5.9 | 4.9 | 5.9 |
|  | Ion concentration of divalent or multivalent metal ion or ions (ppm) | 1 | 0.6 | 0.7 | 1 |

TABLE 15

|  |  | Pigment ink (black) | Dye ink (yellow) | Dye ink (magenta) | Dye ink (cyan) |
|---|---|---|---|---|---|
| Comp. Ex. 1 | Lithium ion (ppm) | 14 | 15 | 20 | 22 |
|  | Sodium ion (ppm) | 58 | 2152 | 1950 | 1923 |
|  | Potassium ion (ppm) | 2 | 22 | 15 | 32 |
|  | Total ion concentration (ppm) | 74 | 2189 | 1985 | 1977 |
|  | Ion concentration ratio (dye ink/pigment ink) | — | 29.6 | 26.8 | 26.7 |

TABLE 15-continued

|  |  | Pigment ink (black) | Dye ink (yellow) | Dye ink (magenta) | Dye ink (cyan) |
|---|---|---|---|---|---|
|  | Ion concentration of divalent or multivalent metal ion or ions (ppm) | 1.2 | 8.5 | 11.2 | 13.2 |
| Comp. Ex. 2 | Lithium ion (ppm) | 0 | 15 | 20 | 22 |
|  | Sodium ion (ppm) | 35 | 2152 | 1950 | 1923 |
|  | Potassium ion (ppm) | 0 | 22 | 15 | 32 |
|  | Total ion concentration (ppm) | 35 | 2189 | 1985 | 1977 |
|  | Ion concentration ratio (dye ink/pigment ink) | — | 62.5 | 56.7 | 56.5 |
|  | Ion concentration of divalent or multivalent metal ion or ions (ppm) | 0.8 | 8.5 | 11.2 | 13.2 |
| Comp. Ex. 3 | Lithium ion (ppm) | 0 | 0 | 0 | 0 |
|  | Sodium ion (ppm) | 35 | 1635 | 1552 | 1595 |
|  | Potassium ion (ppm) | 0 | 2 | 4 | 1 |
|  | Total ion concentration (ppm) | 35 | 1637 | 1556 | 1596 |
|  | Ion concentration ratio (dye ink/pigment ink) | — | 46.8 | 44.5 | 45.6 |
|  | Ion concentration of divalent or multivalent metal ion or ions (ppm) | 0.8 | 0.7 | 0.9 | 1.1 |
| Comp. Ex. 4 | Lithium ion (ppm) | 14 | 15 | 20 | 22 |
|  | Sodium ion (ppm) | 58 | 2152 | 1950 | 1923 |
|  | Potassium ion (ppm) | 2 | 22 | 15 | 32 |
|  | Total ion concentration (ppm) | 74 | 2189 | 1985 | 1977 |
|  | Ion concentration ratio (dye ink/pigment ink) | — | 29.6 | 26.8 | 26.7 |
|  | Ion concentration of divalent or multivalent metal ion or ions (ppm) | 1.2 | 8.5 | 11.2 | 13.2 |
| Comp. Ex. 5 | Lithium ion (ppm) | 0 | 22 | 15 | 18 |
|  | Sodium ion (ppm) | 33 | 2105 | 2463 | 2305 |
|  | Potassium ion (ppm) | 0 | 15 | 22 | 16 |
|  | Total ion concentration (ppm) | 33 | 2142 | 2500 | 2339 |
|  | Ion concentration ratio (dye ink/pigment ink) | — | 64.9 | 75.8 | 70.9 |
|  | Ion concentration of divalent or multivalent metal ion or ions (ppm) | 0.7 | 7.6 | 10.2 | 13.2 |
| Comp. EX. 6 | Lithium ion (ppm) | 2 | 13 | 22 | 32 |
|  | Sodium ion (ppm) | 78 | 2135 | 1922 | 1775 |
|  | Potassium ion (ppm) | 35 | 21 | 15 | 22 |
|  | Total ion concentration (ppm) | 115 | 2169 | 1959 | 1829 |
|  | Ion concentration ratio (dye ink/pigment ink) | — | 18.9 | 17.0 | 15.9 |
|  | Ion concentration of divalent or multivalent metal ion or ions (ppm) | 1.1 | 8.6 | 12.1 | 10.5 |
| Comp. Ex. 7 | Lithium ion (ppm) | 1 | 13 | 22 | 32 |
|  | Sodium ion (ppm) | 61 | 2135 | 1922 | 1775 |
|  | Potassium ion (ppm) | 37 | 21 | 15 | 22 |
|  | Total ion concentration (ppm) | 99 | 2169 | 1959 | 1829 |
|  | Ion concentration ratio (dye ink/pigment ink) | — | 21.9 | 19.8 | 18.5 |
|  | Ion concentration of divalent or multivalent metal ion or ions (ppm) | 1.3 | 8.6 | 12.1 | 10.5 |
| Comp. Ex. 8 | Lithium ion (ppm) | 0 | 468 | 389 | 482 |
|  | Sodium ion (ppm) | 36 | 15 | 12 | 9 |
|  | Potassium ion (ppm) | 0 | 3 | 2 | 1 |
|  | Total ion concentration (ppm) | 36 | 486 | 403 | 492 |
|  | Ion concentration ratio (dye ink/pigment ink) | — | 13.5 | 11.2 | 13.7 |
|  | Ion concentration of divalent or multivalent metal ion or ions (ppm) | 0.6 | 0.6 | 0.7 | 1.0 |

TABLE 16

|  | Evaluation by microscopic observation | Evaluation of nozzle clog-up | Evaluation of suction pump durability |
|---|---|---|---|
| Example 1 | + | + | + |
| Example 2 | + | + | ++ |
| Example 3 | + | + | + |
| Example 4 | + | + | ++ |
| Example 5 | + | + | ++ |
| Comp. Ex. 1 | − | − | − |
| Comp. Ex. 2 | − | − | − |
| Comp. Ex. 3 | − | − | − |
| Comp. Ex. 4 | ± | ± | − |
| Comp. Ex. 5 | − | − | − |
| Comp. Ex. 6 | − | − | − |
| Comp. Ex. 7 | ± | − | ± |
| Comp. Ex. 8 | ± | ± | − |

As shown in Table 16, according to the water base ink sets for ink-jet recording prepared in Examples, the dispersibility or the solubility was stable when the pigment ink and the dye ink were present singly, and the pigment coagulation was not caused when the pigment ink and the dye ink are subjected to the contact and the mixing. Therefore, the discharge failure was not caused, which would be otherwise caused when the pigment coagulate clogged the printing head nozzle head and/or when the pigment coagulate was adhered and secured to the surroundings of the nozzle to damage the repelling ink coat surface. Further, the nonuniform wiping and the deterioration of the air-tightness of the suction cap were not caused, which would be otherwise caused by the pigment coagulate adhered and secured to the wiper and the suction cap. Furthermore, the malfunction was not caused, which would be otherwise caused by the pigment coagulate adhered to the interior of the suction pump. Therefore, even when the maintenance unit was not constructed in a complicated manner, then the pigment ink and the dye ink were successfully used in combination, and the low cost, the high printing quality, and the high reliability were successfully realized simultaneously. On the other hand, the water base ink sets for ink-jet recording prepared in Comparative Examples involved the problem in any one of the evaluation tests.

As clarified from the fact explained above, even when the pigment ink and the dye ink are used in combination in the ink set for the ink-jet printer according to the present invention, the pigment is not coagulated by the contact and the mixing of the pigment ink and the dye ink. The printing quality is not deteriorated by the discharge failure which would be otherwise caused, for example, by the nozzle clog-up. Further, the pigment ink and the dye ink can be used in combination without complicating the structure of the maintenance unit. Therefore, the ink set of the present invention successfully contributes to the decrease in cost of the ink-jet recording apparatus. Therefore, when the water base ink set for ink-jet recording according to the present invention is used, it is possible to simultaneously realize the high printing quality and the high reliability with the ink-jet recording apparatus at the low cost.

What is claimed is:

1. A water base ink set for ink-jet recording comprising:
a pigment ink which contains water, a water-soluble organic solvent, and a pigment and which includes at least one of lithium ion, potassium ion, and sodium ion, wherein a total ion concentration $Cp1$ of the ions satisfies 60 ppm$\leq Cp1$, and a total ion concentration $Cp2$ of divalent or multivalent metal ion or ions satisfies $Cp2 \leq 10$ ppm; and
a dye ink which contains water, a water-soluble organic solvent, and a dye and which includes at least one of lithium ion, potassium ion, and sodium ion, wherein a total ion concentration $Cd1$ of the ions included in the dye ink satisfies 300 ppm$<Cd1 \leq 1,800$ ppm, and a total ion concentration $Cd2$ of divalent or multivalent metal ion or ions included in the dye ink satisfies $Cd2 \leq 10$ ppm, wherein:
$Cd1 \leq 25$ $Cp1$ is satisfied.

2. The water base ink set for ink-jet recording according to claim 1, wherein the pigment ink further contains polyvinylpyrrolidone having a weight average molecular weight of 10,000 to 40,000 by 0.5 to 2% by weight.

3. The water base ink set for ink-jet recording according to claim 1, wherein the pigment ink is a black ink and the dye ink is a color ink.

4. The water base ink set for ink-jet recording according to claim 1, wherein 70 ppm$\leq Cp1$ and 300 ppm$<Cd1$ 1,700 are satisfied.

5. The water base ink set for ink-jet recording according to claim 1, wherein $Cp2 \leq 2$ ppm and $Cd2 \leq 2$ ppm are satisfied.

6. The water base ink set for ink-jet recording according to claim 1, wherein the pigment ink includes the lithium ion, the potassium ion, and the sodium ion.

7. The water base ink set for ink-jet recording according to claim 6, wherein the dye ink includes the lithium ion, the potassium ion, and the sodium ion.

8. The water base ink set for ink-jet recording according to claim 1, wherein the water-soluble organic solvent is triethylene glycol n-butyl ether.

9. The water base ink set for ink-jet recording according to claim 1, wherein the dye has the lithium ion as a counter ion.

10. The water base ink set for ink-jet recording according to claim 1, wherein the ink set is in a form of ink cartridge.

11. An ink-jet recording apparatus comprising:
an ink-jet head which is formed with nozzles for jetting an ink of a first color and nozzles for jetting an ink of a second color different from the first color; and
a maintenance unit which includes a wiper which wipes the nozzles for the first and second colors, a suction cap which caps the nozzles, a suction pump which sucks the ink through the suction cap, and a drain tank which stores a drain discharged from the suction pump, wherein:
the ink of the first color is a pigment ink which contains water, a water-soluble organic solvent, and a pigment and which includes at least one of lithium ion, potassium ion, and sodium ion, wherein a total ion concentration $Cp1$ of the ions satisfies 60 ppm$\leq Cp1$, and a total ion concentration $Cp2$ of divalent or multivalent metal ion or ions satisfies $Cp2 \leq 10$ ppm; and
the ink of the second color is a dye ink which contains water, a water-soluble organic solvent, and a dye and which includes at least one of lithium ion, potassium ion, and sodium ion, wherein a total ion concentration $Cd1$ of the ions included in the dye ink satisfies 300 ppm$<Cd1 \leq 1,800$ ppm, and a total ion concentration $Cd2$ of divalent or multivalent metal ion or ions included in the dye ink satisfies $Cd2 \leq 10$ ppm, and wherein $Cd1 \leq 25$ $Cp1$ is satisfied.

12. The ink-jet recording apparatus according to claim 11, wherein the pigment ink further contains polyvinylpyrrolidone having a weight average molecular weight of 10,000 to 40,000 by 0.5 to 2% by weight.

13. The ink-jet recording apparatus according to claim 11, wherein the pigment ink is a black ink and the dye ink is a color ink.

14. The ink-jet recording apparatus according to claim 11, wherein 70 ppm$\leq Cp1$ and 300 ppm$<Cd1 \leq 1,700$ are satisfied.

15. The ink-jet recording apparatus according to claim 11, wherein $Cp2 \leq 2$ ppm and $Cd2 \leq 2$ ppm are satisfied.

16. The ink-jet recording apparatus according to claim 11, wherein the pigment ink includes the lithium ion, the potassium ion, and the sodium ion.

17. The ink-jet recording apparatus according to claim 16, wherein the dye ink includes the lithium ion, the potassium ion, and the sodium ion.

18. The ink-jet recording apparatus according to claim 11, wherein the water-soluble organic solvent is triethylene glycol n-butyl ether.

19. The ink-jet recording apparatus according to claim 11, wherein the dye has the lithium ion as a counter ion.

20. A waterbase ink set for ink-jet recording comprising:
a pigment ink which contains water, a water-soluble organic solvent, and a pigment, and which includes at least one of lithium ion, potassium ion, and sodium ion, wherein a total ion concentration $Cp1$ of the ions satisfies 60 ppm$\leq Cp1$, and a total ion concentration of $Cp2$ of divalent or multivalent metla ion or ions satisfies $Cp2 \leq 10$ ppm; and
a dye ink which contains water, a water-soluble organic solvent, and a water-soluble dye and which includes at least one of lithium ion, potassium ion, and sodium ion, wherein a total ion concentration $Cd1$ of the ions included in the dye ink satisfies $Cd1 \leq 1,800$ ppm, and a total ion concentration $Cd2$ of divalent or multivalent metal ion or ions included in the dye ink satisfies $Cd2 \leq 10$ ppm, wherein:
$Cd1 \leq 25$ $Cp1$ is satisfied.

21. The water base ink set for ink-jet recording according to claim 20, wherein the pigment ink further contains polyvinylpyrrolidone having a weight average molecular weight of 10,000 to 40,000 by 0.5 to 2% by weight.

22. The water base ink set for ink-jet recording according to claim 20, wherein the pigment ink is a black ink and the dye ink is a color ink.

23. The water base ink set for ink-jet recording according to claim 20, wherein 70 ppm$\leq Cp1$ and $Cd1 \leq 1,700$ are satisfied.

24. The water base ink set for ink-jet recording according to claim 20, wherein $Cp2 \leq 2$ ppm and $Cd2 \leq 2$ ppm are satisfied.

25. The water base ink set for ink-jet recording according to claim 20, wherein the pigment ink includes the lithium ion, the potassium ion, and the sodium ion.

26. The water base ink set for ink-jet recording according to claim 25, wherein the dye ink includes the lithium ion, the potassium ion, and the sodium ion.

27. The water base ink set for ink-jet recording according to claim 20, wherein the water-soluble organic solvent is triethylene glycol n-butyl ether.

28. The water base ink set for ink-jet recording according to claim 20, wherein the dye has the lithium ion as a counter ion.

29. The water base ink set for ink-jet recording according to claim 20, wherein the ink set is in a form of ink cartridge.

30. An ink-jet recording apparatus comprising:
an ink-jet head which is formed with nozzles for jetting an ink of a first color and nozzles for jetting an ink of a second color different from the first color; and
a maintenance unit which includes a wiper which wipes the nozzles for the first and second colors, a suction cap which caps the nozzles, a suction pump which sucks the ink through the suction cap, and a drain tank which stores a drain discharged from the suction pump, wherein:
the ink of the first color is a pigment ink which contains water, a water-soluble organic solvent, and a pigment and which includes at least one of lithium ion, potassium ion, and sodium ion, wherein a total ion concentration $Cp1$ of the ions satisfies 60 ppm$\leq Cp1$, and a total ion concentration $Cp2$ of divalent or multivalent metal ion or ions satisfies $Cp2 \leq 10$ ppm; and
the ink of the second color is a dye ink which contains water, a water-soluble organic solvent, and a water-soluble dye and which includes at least one of lithium ion, potassium ion, and sodium ion, wherein a total ion concentration $Cd1$ of the ions included in the dye ink satisfies $Cd1 \leq 1,800$ ppm, and a total ion concentration $Cd2$ of divalent or multivalent metal ion or ions included in the dye ink satisfies $Cd2 \leq 10$ ppm, and wherein $Cd1 \leq 25\, Cp1$ is satisfied.

31. The ink-jet recording apparatus according to claim 30, wherein the pigment ink further contains polyvinylpyrrolidone having a weight average molecular weight of 10,000 to 40,000 by 0.5 to 2% by weight.

32. The ink-jet recording apparatus according to claim 30, wherein the pigment ink is a black ink and the dye ink is a color ink.

33. The ink-jet recording apparatus according to claim 30, wherein 70 ppm$\leq Cp1$ and $Cd1 \leq 1,700$ are satisfied.

34. The ink-jet recording apparatus according to claim 30, wherein $Cp2 \leq 2$ ppm and $Cd2 \leq 2$ ppm are satisfied.

35. The ink-jet recording apparatus according to claim 30, wherein the pigment ink includes the lithium ion, the potassium ion, and the sodium ion.

36. The ink-jet recording apparatus according to claim 35, wherein the dye ink includes the lithium ion, the potassium ion, and the sodium ion.

37. The ink-jet recording apparatus according to claim 30, wherein the water-soluble organic solvent is triethylene glycol n-butyl ether.

38. The ink-jet recording apparatus according to claim 30, wherein the dye has the lithium ion as a counter ion.

* * * * *